United States Patent
Lanz et al.

(10) Patent No.: US 8,436,913 B2
(45) Date of Patent: May 7, 2013

(54) METHOD FOR EFFICIENT TARGET DETECTION FROM IMAGES ROBUST TO OCCLUSION

(75) Inventors: Oswald Lanz, Appiano Sulla Strada Del Vino (IT); Stefano Messelodi, Arco (IT)

(73) Assignee: Fondazione Bruno Kessler, Trento (IT)

(*) Notice: Subject to any disclaimer, the term of this patent is extended or adjusted under 35 U.S.C. 154(b) by 227 days.

(21) Appl. No.: 12/807,388

(22) Filed: Sep. 1, 2010

(65) Prior Publication Data

US 2011/0050940 A1 Mar. 3, 2011

(30) Foreign Application Priority Data

Sep. 1, 2009 (EP) .................................... 09425338

(51) Int. Cl.
*H04N 5/235* (2006.01)
*H04N 5/228* (2006.01)

(52) U.S. Cl.
USPC ....................................................... 348/222.1

(58) Field of Classification Search ................. 382/160, 382/205, 228; 348/222.1, 207.99
See application file for complete search history.

(56) References Cited

U.S. PATENT DOCUMENTS

| 7,369,682 | B2* | 5/2008 | Yang et al. | 382/103 |
| 7,639,841 | B2* | 12/2009 | Zhu et al. | 382/104 |
| 7,916,935 | B2* | 3/2011 | Larsen et al. | 382/154 |
| 7,929,775 | B2* | 4/2011 | Hager et al. | 382/224 |
| 7,965,867 | B2* | 6/2011 | Lanz | 382/103 |
| 8,204,302 | B2* | 6/2012 | Larsen et al. | 382/154 |
| 2003/0228032 | A1* | 12/2003 | Rui et al. | 382/103 |
| 2005/0011959 | A1* | 1/2005 | Grosvenor | 235/470 |
| 2006/0078163 | A1* | 4/2006 | Rui et al. | 382/103 |
| 2006/0285755 | A1* | 12/2006 | Hager et al. | 382/224 |
| 2008/0031492 | A1* | 2/2008 | Lanz | 382/103 |

OTHER PUBLICATIONS

Bo Wu, et al., "Detection and Tracking of Multiple, Partially Occluded Humans by Bayesian Combination of Edgelet Based Part Detectors," Univ. of Southern California, Dec. 13, 2006.
Zia Khan, et al., "MCMC-Based Particle Filtering for Tracking a Variable Number of Interacting Targets," IEEE Computer Society, vol. 27, #11, Nov. 2005.
J. Czyz, et al., "A Particle Filter for Joint Detection and Tracking of Color Objects," Image and Vision Computing, Jul. 29, 2006.
M. Isard, et al., "BraMBLe: A Bayesian Multiple-Blob Tracker," Compaq Systems Research Center, Palo Alto, California 2003.

(Continued)

*Primary Examiner* — Nicholas Giles
(74) *Attorney, Agent, or Firm* — Abelmanb, Frayne & Schwab

(57) ABSTRACT

The method for efficient target detection from images robust to occlusion disclosed by the present invention detects the presence and spatial location of a number of objects in images. It consists in (i) an off-line method to compile an intermediate representation of detection probability maps that are then used by (ii) an on-line method to construct a detection probability map suitable for detecting and localizing objects in a set of input images efficiently. The method explicitly handles occlusions among the objects to be detected and localized, and objects whose shape and configuration is provided externally, for example from an object tracker. The method according to the present invention can be applied to a variety of objects and applications by customizing the method's input functions, namely the object representation, the geometric object model, its image projection method, and the feature matching function.

20 Claims, 5 Drawing Sheets

OTHER PUBLICATIONS

O. Lanz, et al., "An Appearance-Based Particle Filter for Visual Tracking in Smart Rooms," Fondazione Bruno Kessler-IRST, Povo di Trento, Italy 2008.

Brunelli, et al., "A Generative Approach to Audio-Visual Person Tracking," Clear 2006, LNCS 4122, pp. 55-68, Springer-Vorlag Berlin Heidelberg 2007.

* cited by examiner

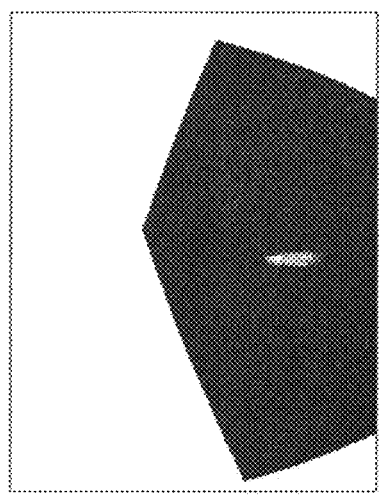
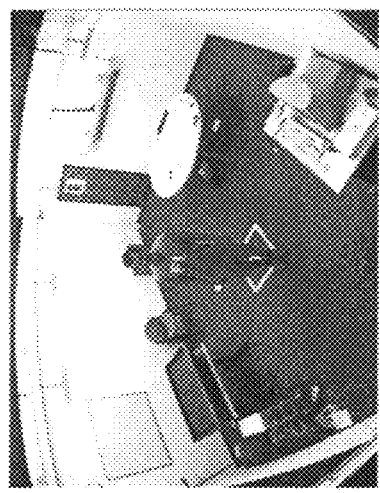
Fig. 2

METHOD FOR EFFICIENT TARGET DETECTION FROM IMAGES ROBUST TO OCCLUSION

FIELD OF THE INVENTION

The present invention refers to the field of human centered IT applications, in particular the present invention refers to the technical field of camera based monitoring of movements and activities of people.

STATE OF THE ART

Monitoring movements of people, and their activities more in general, is a basic requirement for a number of human centered IT applications, which span areas with impact on society and economy such as Security and Surveillance, Ambient Assisted Living, Sports Analysis and Interactive Entertainment. To minimize intrusiveness, camera based systems are of particular interest, also because video streams encode large amount of information upon the observed scene, potentially supporting a highly detailed analysis. However, extracting relevant content from images in unconstrained settings is still challenging and requires substantial progress beyond current state-of-the-art.

A major challenge here is the automatic detection of people or, more in general, of specific objects, in images. This task becomes even more challenging for interactive applications, where the detection must be achieved almost instantaneously in order to enable the application to react in real time. The current invention addresses this problem focalizing on real time performance. An analysis of state-of-the-art video analytic systems reveals that a major difficulty consists in the online detection of newly entered targets, and their characterization in terms of a visual signature to be used as a target model to track the object in subsequent images. Detection must be based on observable features that are largely invariant within the class of target objects of interest (e.g. physical shape of an object), while target properties that are specific to each instance are assembled in the signature (e.g. physical size, color properties). In this setting, the detection task is the typically more demanding one as it can not make use of strong priors available at design time to limit the search, such as temporal continuity for the tracking. The key to efficiency is then to build, at each time instance, a data driven search prior on the fly from low level cues that can be extracted quickly from images.

In the article "Detection and tracking of multiple, partially occluded humans by Bayesian combination of edgelet based part detectors" by B. Wu and R. Nevatia, International Journal of Computer Vision, 75(2), 2007, a people detector and tracking system is presented. Detection is based on the extraction of body parts that are combined using a joint likelihood model making the system able to deal with partial occlusions. Tracking is based on the association of the extracted body parts with the expected position of the tracked objects and, when no association are found, on the application of the meanshift tracker. Activation and termination of tracks rely on the confidences computed from the detection responses. In the article: "MCMC-based particle filtering for tracking a variable number of interacting targets" By Z. Khan, T. Balch, and F. Dellaert, IEEE Transactions on PAMI, 27(11), 2005, a MRF motion prior is introduced to cope with target interactions, a Markov chain Monte Carlo sampling to address the exponential complexity and an extension of the method to deal with cases in which the number of target changes over time. A detection method using particle filtering is proposed in the article "A particle filter for joint detection and tracking of color objects", by J. Czyz, B. Ristic, and B. Macq.—*Image Vision Comput.*, 25(8): 1271-1281, 2007. A two-state Markov chain is introduced, and the problem is translated into sequential Bayesian estimation. The observation density is based on selected discriminative Haar-like features. In the article: "BraMBLe: A Bayesian multiple-blob tracker" by M. Isard and J. MacCormick—*ICCV,* 2003, estimation is accomplished jointly, in an expanded space that includes a discrete dimension reporting the number of targets.

In the light of the above described technical problem and the analysis of state-of-the-art methods, the present application discloses a novel detection method which conveniently marries, in terms of computational load, the power of model based search and the efficiency of data driven detection.

BRIEF DESCRIPTION OF THE ATTACHED DRAWINGS

FIG. 2 shows the input image and contour likelihood function computed using the example shown in FIG. 1.

SUMMARY OF THE INVENTION

Bayesian methods, for visual tracking, with the particle filter as its most prominent instance, have proven to work effectively in the presence of clutter, occlusions, and dynamic background. When applied to track a variable number of targets, however, they become inefficient due to the absence of strong priors. The present application discloses an efficient method for computing a target detection prior (called detection probability map hereafter) suitable for real time applications. Formally, the method is derived as the inverse of an occlusion robust image likelihood, and is therefore theoretically grounded and sound. It has the advantage of being fully integrated in the Bayesian tracking framework—as shown in the article "A sampling algorithm for occlusion robust multi target detection", document which is not published yet and is enclosed in the present patent application—and reactive as it uses sparse features not explained by tracked objects. The method disclosed by the present invention detects the presence and spatial location of a number of objects in images. It consists in (i) an off-line method to compile an intermediate representation of detection probability maps that are then used by (ii) an on-line method to construct a detection probability map suitable for detecting and localizing objects in a set of input images efficiently. The method explicitly handles occlusions among the objects to be detected and localized, and objects whose shape and configuration is provided externally, for example from an object tracker. The method according to the present invention can be applied to a variety of objects and applications by customizing the method's input functions, namely the object representation, the geometric object model, its image projection method, and the feature matching function.

DETAILED DESCRIPTION OF THE INVENTION

Figure 1:
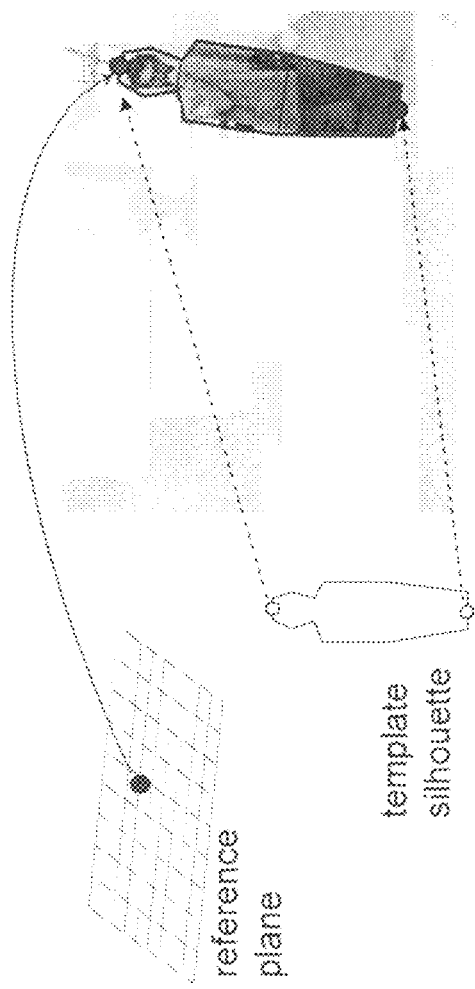
FIG. 1 shows an example of state representation, geometric shape model and image projection method suitable for applying the method according to the present invention to a PDL (People Detection and Localization) task.

The method according to the present invention initially requires the user to provide geometric information about the capturing cameras (the 3D position of the optical centre and camera orientation, as well as intrinsic parameters of the sensor and the optical lenses; i.e. camera calibration parameters), and to perform the following steps:

1. Choose a suitable numerical representation for the object's configuration to be recognized. As an example, if a rigid and vertically symmetric object moves on a horizontal plane all the object's configurations can be represented in two-dimensional space, through a two dimensional vector describing the objects coordinates on the horizontal plane. An instance of such representation is hereafter referred to as the object's state.
2. Select a geometric object model that is parameterized with the chosen numerical representation and implement an image projection procedure that maps the object mode onto an image according to a given state hypothesis. An example for people detection and localization (hereafter referred to as PDL) is shown in enclosed FIG. 1.
3. Implement a likelihood function between the rendered object model and image features that peaks on those object states that fit an un-occluded instance of the object in a real image. The likelihood function must be a combination (typically a sum or a product) of elementary functions that operate on single features pixel. An example is briefly described in enclosed FIG. 1 and shown in FIG. 2 and in section 4 of the article: *"An Appearance-based Particle Filter for Visual Tracking in Smart Rooms."* By O. Lanz, P. Chippendale, R. Brunelli—LNCS 4625/2008, Classification of Events, Activities and Relationships, Evaluation and Workshop—CLEAR'07, Baltimore, Md., USA, May 8-9, 2007, pp. 57-69.

The above calculated functions are used by the off-line part of the method according to the present invention to compile the intermediate representations of detection probability maps, hereafter referred to as support maps. The on-line part of the method according to the present invention then uses them to process a set of live images (one image per camera; a typical set up uses three to four color cameras to monitor a squared room of size 8×8 m² in a PDL task).

Figure 4:
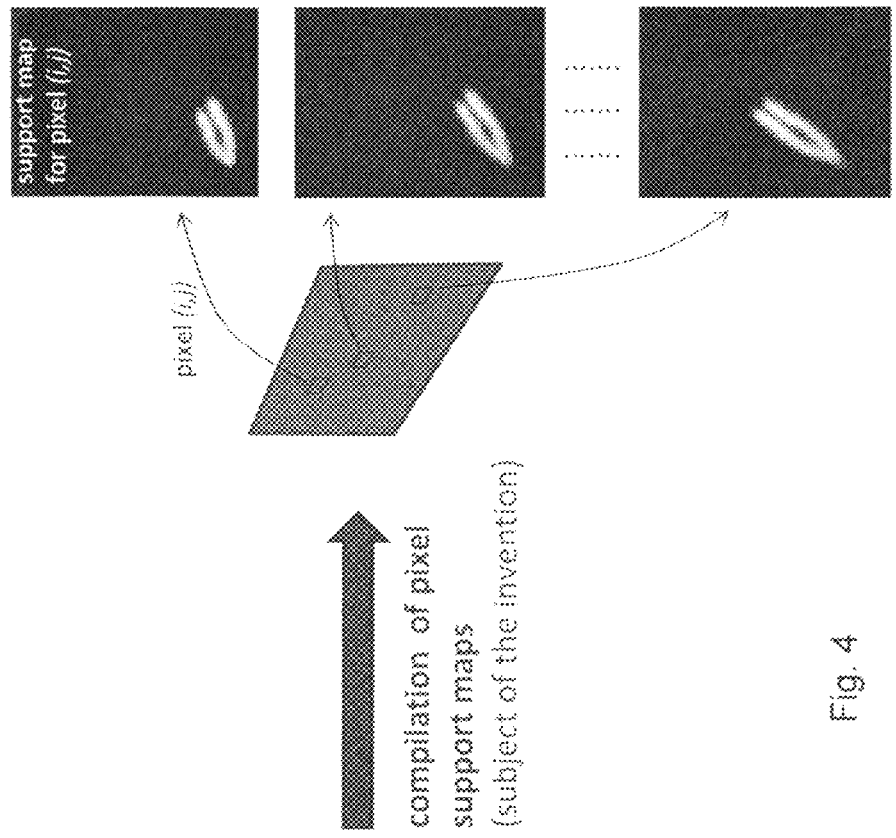
FIG. 4 shows a schematic view of the off-line part of the method according to the present invention.

A schematic view of the off-line method is shown in enclosed FIG. 4.

First, a finite number of suitable object states to be detected is chosen. Typically, for this purpose, a grid is superimposed on the state space (e.g. the floor positions in the PDL task), and the centers of the grid cells are chosen.

Then the following procedure is repeated for each state in the chosen set, and for each camera.

Figure 3:
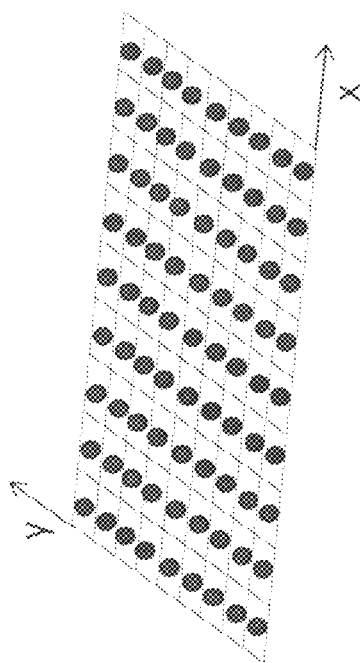
FIG. 3 shows an example of state set used for the PDL task: a regular grid is imposed on the floor plane and the centers of the cells are used to construct the support maps with the off-line method and the detection probability map with the on-line method.

A PDL example is shown in FIG. 3

The state is first rendered using the image projection method and the camera's calibration information.

Then, each pixel activated by the above rendering is accessed in sequence and considered to be an active feature pixel with weight 1.

The contribution of that activated pixel to the likelihood function computed for the rendered state image (i.e. the value of its elementary function), divided by the number of activated pixels in the rendered state image (i.e. the contour length for the PLD example in FIG. 1), is then computed.

The set of all values computed this way for a given pixel are stored in a list that is called the pixel's support map (each entry here is coupled with its originating target state), and then used by the on-line method.

The list of entries is sorted according to the distance of the corresponding state to the camera, with the closest one in front of the sorted list. For the PLD task with a regular state space grid such support maps can be displayed as grey level images: examples are shown in FIG. 4.

The on-line part of the method according to the present invention provides the set up of detection probability maps from pixel maps on a set of input images.

Figure 5:
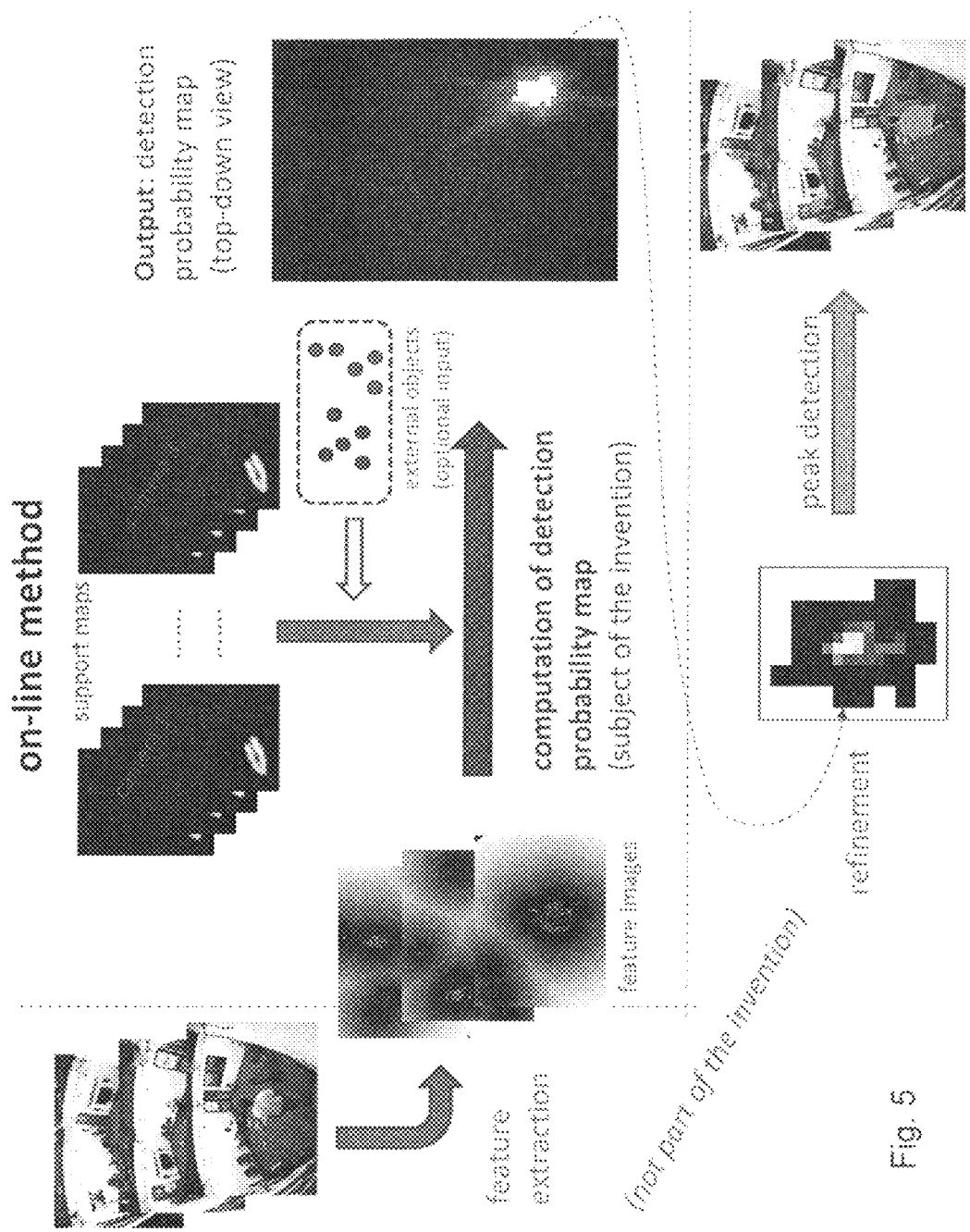
FIG. 5 shows a schematic view of the on-line part of the method according to the present invention.

A schematic view of the on-line method is shown in FIG. 5. Optionally, a list of states of external objects can be provided as input to the on-line method. Each such state is given a positive weight, and the sum of weights associated to the same target must equal 1 (i.e. the weighted states represent a probability distribution for each of the external objects). Such list may be delivered by an object tracker, such as the tracker implementing patent application EU 06116896.9 and U.S. Ser. No. 11/773,483, or be manually created to contain information about static scene objects such as furniture, wherein, for each external object, an image projection method must also be implemented. The online method uses this list to account for potential occlusions caused by external objects.

A pre-processing feature extraction step is first applied to each image (e.g. motion detection followed by edge detection and distance transform in the example of FIG. 5 and more examples are provided in the article "A sampling algorithm for occlusion robust multi target detection", document which is not published yet and is attached to the present patent application).

Then, each feature image is processed as follows and repeated for all the active feature support maps of the activated pixels, for all cameras:

First, the list of object states provided externally is sorted according to their distance to the camera, with the closest one in front of the list. If no external input is provided, this list is considered to be empty.

Then, for each active feature pixel (i.e. pixels with non-zero feature value) the corresponding support map is accessed, and a unique list is created by merging the support map with the list of externally provided object states, and this list is again sorted according to camera distance.

Each external object is also associated a real number whose value is initialized to 0.

The entries of the joint list are then accessed sequentially, from front to back. If an entry belongs to an external object and the considered active feature pixel falls inside its rendered geometric model the real number is incremented with the value of the corresponding state weight. If, instead, the entry belongs to the support map the following is done: The real values $r_i$ of all the external objects indexed by "i" are used to compute a new value $\pi_i(1-r_i)$ which reflects the probability of occlusion by an external object on that pixel at the distance of the considered support map state from the camera.

Finally, this value is multiplied with the value of the support map entry and accumulated in the respective entry of the detection probability map corresponding to the considered support map state.

After accumulating all the active feature support maps for all cameras, the detection probability map shows a peak on those states that fit with an un-occluded object observed in the different images, as shown in the example illustrated in FIG. 5, and can therefore be used for target detection through peak detection.

What is claimed is:

1. A method for detecting targets from images which are captured by one or more cameras, said method comprising the steps of:
   a) collecting information about geometric and calibration parameters corresponding to each of the one or more cameras;
   b) choosing a range of numerical representations defining a range of target configurations to be recognized from the images captured by the one or more cameras, wherein each instance in said range of numerical representations defines a corresponding target state of a plurality of target states associated with the range of numerical representations;
   c) selecting a target model that is associated with the chosen range of numerical representations;
   d) implementing an image projection procedure that overlays the target model onto an image to define a projected target model for each of the plurality of target states associated with the chosen range of numerical representations;
   e) selecting a predetermined range of image features for each of the one or more cameras;
   f) implementing a likelihood function between the projected target model and the predetermined range of image features;
   g) selecting a first set of a predetermined number of the target states associated with the chosen range of numerical representations to be detected;
   h) generating, for a first of the one or more cameras, a feature support map for each image feature in the predetermined range of image features;
   i) projecting a first target state of the predetermined number of target states using the image projection procedure and associated calibration information from the first of the one or more cameras to form an image projection;
   j) determining from the predetermined range of image features, a range of activated image features associated with a first activated pixel from the image projection procedure;
   k) determining a first value associated with how the image feature is projected onto the image;
   l) storing said determined first value paired with the projected target state of step (i) in each of the feature support maps associated with said range of activated image features;
   m) repeating steps (j) through (l) for a next activated pixel that is activated by the image projection procedure;
   n) repeating steps (i) through (m) for a next target state of the predetermined number of the target states to complete the feature support map of each image feature in the predetermined range of image features;
   o) repeating steps (i) through (n) for a next camera of the one or more cameras; and
   p) processing a first plurality of images captured by the one or more cameras to determine a probabilistic occupancy map from the feature support maps.

2. The method of claim 1, wherein said range of numerical representations for a rigid and vertically symmetric target moving on a horizontal plane is a two dimensional vector defining coordinates of the rigid and vertically symmetric target on the horizontal plane.

3. The method of claim 1, wherein said implementing a likelihood function at step (f) includes a combination of elementary functions that operate on single feature pixels.

4. The method of claim 3, wherein said likelihood function is a sum or product of said combination of elementary functions.

5. The method of claim 1, wherein said step (g) is performed by superimposing a matrix of grid cells on a state space, which is defined by said predetermined range of numerical representations, and choosing central portions of the grid cells as said predetermined number of the target states for a rigid horizontal plane and vertically symmetric target.

6. The method of claim 1, further comprising displaying gray level images for PDL (People Detection and Localization) tasks having a regular state space grid.

7. The method of claim 1, wherein the step of generating the probabilistic occupancy map includes the steps of:
   q) applying a feature extraction step on a first image of the plurality of images to identify a set of extracted image features in the predetermined range of image features;
   r) receiving an external list of values paired with states for each of one or more external targets;
   s) identifying the feature support map associated with a first of the set of extracted image features and the capturing camera;
   t) determining a probability value associated with a first element of said identified feature support map and said received external list of values paired with states for each of of the one or more external targets;
   u) storing said probability value paired with the state of said first element in the probabilistic occupancy map;
   v) repeating steps (t) through (u) for a next element of the identified feature support map;
   w) repeating steps (s) through (v) for a next of the set of extracted image features; and
   x) repeating steps (q) through (w) for a next of the plurality of images to complete the probabilistic occupancy map.

8. The method of claim 7, wherein said feature extraction of step (q) comprises providing at least one of motion detection and edge detection.

9. The method of claim 7, wherein the external list of values paired with states of step (r) is delivered by an object tracker, wherein for each external target the image projection procedure is implemented.

10. The method of claim 1, wherein the step of determining a first value associated with how the image feature is projected onto the image comprises the steps of:
   computing a total quantity of image features in said range of activated image features;
   computing a value of an elementary function associated with said first activated pixel for said range of activated image features; and
   dividing said elementary function value by a total value associated of said number of activated pixels and a total value associated with said number of activated image features.

11. The method of claim 7, wherein determining said probability value of step t) comprises the steps of:
   y1) determining, for each of the one or more external targets, one or more elements of said external list that are closer to the camera which captured said first of a plurality of images relative to said first element of said identified feature support map, and whose image projection overlays said first of the set of extracted image features;

y2) determining an occlusion value from said determined one or more elements of each of the one or more external targets;

y3) multiplying said occlusion value with the first value of said first element of the identified feature support map to define said probability value.

12. The method of claim 11, wherein the step of determining said occlusion value for each of the one or more external targets comprises the steps of:

z1) computing, for a first of the one or more external targets, a sum of values of said determined elements to define a first cumulative value;

z2) repeating step (z1) for a next of the one or more external targets to define a next cumulative value;

z3) computing a product of said cumulative values to define said occlusion value.

13. The method of claim 1, further comprising the step of processing a next plurality of images captured by the one or more cameras to determine a next probabilistic occupancy map from the feature support maps.

14. The method of claim 7, wherein the external list of values paired with states of step (r) is provided manually.

15. The method of claim 1, wherein the step of generating the probabilistic occupancy map includes the steps of:

q) applying a feature extraction step on a first image of the plurality of images to identify a set of extracted image features in the predetermined range of image features;

r) identifying the feature support map associated with a first of the set of extracted image features and the capturing camera;

s) determining a probability value associated with a first element of said identified feature support map;

t) storing said probability value paired with the state of said first element in the probabilistic occupancy map;

u) repeating steps (s) through (t) for a next element of the identified feature support map;

v) repeating steps (r) through (u) for a next of the set of extracted image features; and w) repeating steps (q) through (v) for a next of the plurality of images to complete the probabilistic occupancy map.

16. The method of claim 15, wherein said feature extraction of step (q) comprises providing at least one of motion detection and edge detection.

17. The method of claim 15, wherein determining said probability value of step (s) comprises the step of setting said probability value to equal the first value of said first element of the identified feature support map.

18. A computer program product for detecting targets from images which are captured by one or more cameras, the computer program product comprising a non-transitory computer readable medium having computer readable program code embodied therein that, when executed by a processor, causes the processor to:

a) collect information about geometric and calibration parameters corresponding to each of the one or more cameras;

b) choose a range of numerical representations defining a range of target configurations to be recognized from the images captured by the one or more cameras, wherein each instance in said range of numerical representations defines a corresponding target state of a plurality of target states associated with the range of numerical representations;

c) select a target model that is associated with the chosen range of numerical representations;

d) implement an image projection procedure that overlays the target model onto an image to define a projected target model for each of the plurality of target states associated with the chosen range of numerical representations;

e) select a predetermined range of image features for each of the one or more cameras;

f) implement a likelihood function between the projected target model and the predetermined range of image features;

g) select a first set of a predetermined number of the target states associated with the chosen range of numerical representations to be detected;

h) generate, for a first of the one or more cameras, a feature support map for each image feature in the predetermined range of image features;

i) project a first target state of the predetermined number of target states using the image projection procedure and associated calibration information from the first of the one or more cameras to form an image projection;

j) determine from the predetermined range of image features, a range of activated image features associated with a first activated pixel from the image projection procedure;

k) determine a first value associated with how the image feature is projected onto the image;

l) store said determined first value paired with the projected target state of step (i) in each of the feature support maps associated with said range of activated image features;

m) repeat steps (j) through (l) for a next activated pixel that is activated by the image projection procedure;

n) repeat steps (i) through (m) for a next target state of the predetermined number of the target states to complete the feature support map of each image feature in the predetermined range of image features;

o) repeat steps (i) through (n) for a next camera of the one or more cameras; and p) process a first plurality of images captured by the one or more cameras to determine a probabilistic occupancy map from the feature support maps.

19. The computer program product of claim 18, wherein the step of generating the probabilistic occupancy map causes the processor to:

q) apply a feature extraction step on a first image of the plurality of images to identify a set of extracted image features in the predetermined range of image features;

r) receive an external list of values paired with states for each of one or more external targets;

s) identify the feature support map associated with a first of the set of extracted image features and the capturing camera;

t) determine a probability value associated with a first element of said identified feature support map and said received external list of values paired with states for each of of the one or more external targets;

u) store said probability value paired with the state of said first element in the probabilistic occupancy map;

v) repeat steps (t) through (u) for a next element of the identified feature support map;

w) repeat steps (s) through (v) for a next of the set of extracted image features; and x) repeat steps (q) through (w) for a next of the plurality of images to complete the probabilistic occupancy map.

20. The computer program product of claim 18, wherein the step of generating the probabilistic occupancy map causes the processor to:

q) apply a feature extraction step on a first image of the plurality of images to identify a set of extracted image features in the predetermined range of image features;

r) identify the feature support map associated with a first of the set of extracted image features and the capturing camera;
s) determine a probability value associated with a first element of said identified feature support map;
t) store said probability value paired with the state of said first element in the probabilistic occupancy map;
u) repeat steps (s) through (t) for a next element of the identified feature support map;
v) repeat steps (r) through (u) for a next of the set of extracted image features; and
w) repeat steps (q) through (v) for a next of the plurality of images to complete the probabilistic occupancy map.

* * * * *